United States Patent Office 3,647,603
Patented Mar. 7, 1972

3,647,603
COLD-FORMABLE DECORATIVE LAMINATE AND METHOD OF MAKING SAME
Pascal E. Esemplare, Mountainside, and Charles P. West, Metuchen, N.J., assignors to Vi-Vox, Incorporated, Pittsburgh, Pa., and Frankel Company, Incorporated, Detroit, Mich., fractional part interest to each
No Drawing. Filed Jan. 6, 1969, Ser. No. 789,420
Int. Cl. B32b *15/08, 27/42;* D06n *7/00*
U.S. Cl. 161—5        11 Claims

ABSTRACT OF THE DISCLOSURE

A cold post-formable, sheet-like, decorative laminate of high chemical-, abrasion-, heat-, and crack-resistance, comprising a flexible metal base sheet, a paper interlayer bonded to the metal and to a flexible surface layer comprising a thermosetting mixture of melamine formaldehyde resin and alkyd resin.

BACKGROUND OF THE INVENTION

The thermosetting amino resins include, as most important members of this class of resins, urea-formaldehyde and melamine-formaldehyde. The commercial usefulness of the latter compositions is due in large part to their properties as colorless, odorless, hard materials of decreased flammability and excellent chemical resistance to many corrosive environments. Such properties suit them for use in laminates, coatings and molded articles of end use applications requiring one or more such property characteristics. In general, the melamine-based resins exhibit greater resistance to moisture and chemicals, as greases, solvents, oils, acids, etc., than do the urea-based resins. The melamines also provide excellent abrasion resistance.

In the production of melamine resins, melamine (1,3,5-triamino-2,4,6-triazine or cyanuramide), commonly produced by the heating of urea in the presence of ammonia, or by the polymerization of cyanamide in the presence of ammonia, is reacted, by a condensation-type reaction, with formaldehyde, $CH_2O$. Limitation of the condensation reaction, in accordance with known procedures, is productive of a variety of end products, ranging from relatively low molecular weight, only slightly polymerized and relatively highly soluble materials on the one hand, to essentially completely crosslinked, high molecular weight, infusible and insoluble materials on the other. The former class of materials are commonly produced, in the form of alcoholic or aqueous solutions, for use in adhesive, coating or laminate applications, and, in such instances, the resin commonly essentially comprises the initially produced methylol compounds which serve as the monomers for further condensation, or only slightly polymerized reaction products, which, in either case, may be further polymerized or cured by the application of heat, e.g. to the final product of which the melamine resin forms a part, as coating, laminate, bonding agent or the like.

Such further polymerization or cure of the melamine resins may be accelerated by concurrent use of heat and special catalysts, as also known to the art.

Such presently known melamine-formaldehyde resins, including those from first reaction products of the melamine-formaldehyde condensation reaction, to more highly polymerized products compatible in solubility and viscosity characteristics with the laminate application requirements of this invention, as hereinafter more fully described, are included in the term "melamine resin" as used herein, as are modifications of such products, for example, by inclusion or reaction with curing catalysts, or by reaction of the resin monomer or partially reacted polymer with modifying agents, as various amines, amides, alcohols, etc., as known to the art to provide special resin properties, so long as such modifications are compatible with the hereinafter described objectives of the invention.

A common application of melamine resins is in the production of clear, hard, abrasion-resistant, chemically inert surfaces on decorative laminated sheet products, as those comprising a base of phenolic-impregnated kraft paper layers. Such products usually bear, over the brittle, impregnated multi-layer paper base, a melamine print layer bearing the desired decorative design, and, bonded to and impregnating the latter, a clear surface-forming melamine resin layer to confer the desired environmentally resistive properties.

Such prior art composites, although varying somewhat in degree of flexibility and formability, depending upon, e.g. the nature, thickness and number of superimposed, bonded layers and the extent of resin polymerization provided, do, however, possess in common an inherent stiffness and brittleness which limits their application to end uses wherein either no out-of-flat forming is required or where hot forming under pressure is feasible and wherein final curing to most rigid condition can be effected safely without cracking either the hard melamine surface or the underlying brittle resin-impregnated base layers.

Attempts have been made in the past to overcome these deficiencies of prior art multi-layer laminates and to provide products of sufficient flexibility as to be postformable at room temperature. For example, as early as 1935, U.S. Pat. No. 2,003,752 provided a bendable laminate comprising a metal base sheet to which was bonded a fibrous layer which was impregnated throughout with a thermoplastic resin, as shellac, copal, manila gum or aniline-formaldehyde resins, and which laminates were formable under application of moderate heat (15–200° F. or higher) and pressure.

More recently, "flexible" grades of multi-layered, resin-impregnated laminates have been developed, but these require pre-heating to flexibilize the laminate, followed by careful shaping and holding, as by precision clamps, etc., to secure the desired contour, and finally, baking to complete curing and to set the final article structure.

Such prior art attempts, however, have not succeeded in providing a material which combines the desired flexibility and crack-resistance on cold (room temperature) forming, together with ease of cutting and shaping, and the enhanced surface properties of hardness, abrasion-resistance chemical inertness, and heat-resistance, which are required in the multitude of applications to which the present invention is directed. There have long been needs for such a material, for example in the furniture, wall- and floor-covering, construction, and appliance industries.

THE INVENTION

The present invention, in a preferred embodiment thereof, provides a composite, sheet-like article, as a stock material, which is post-formable, without cracking or delamination, at room temperature, and which comprises a biaxially flexible, thin metal sheet, e.g., of flat rolled carbon steel, for example of a thickness from about 1 to about 10 mils, having a decorative fibrous, e.g. paper, sheet bonded thereto, by means of a high temperature, resistant, flexible, room temperature curable adhesive, e.g. a neoprene rubber-oil soluble phenolic resin adhesive. A protective, clear surface layer is provided, self-bonded to the paper sheet, and comprises, preferably, from about 25 to about 50 parts by weight of a melamine-formaldehyde resin, together with a flexibilizing amount, preferably from 50 to about 75 parts by weight, of an alkyd resin.

The invention also provides, as a separate article of commerce, applicable directly to any suitable base material or article, a decorative "tape" comprising a fibrous, e.g. paper, sheet, bearing the aforesaid protective layer on one surface thereof and, preferably, a contact adhesive on the other.

Both types of products can be produced continuously and economically by means of simple, relatively inexpensive equipment, as roll laminators, with readily available materials, as paper stock, metal foils and commercially available resin components.

Although such melamine-formaldehyde resin properties as chemical inertness, abrasion- and water-resistance, etc., are desirable and are utilized in many prior art applications, they have not been available heretofore, even in thin film form, in application requiring or most economically served by ready room temperature formability.

Illustratively, tests were conducted wherein several commercially available melamine resin solutions, for example, "Plaskon"[1] 3369 containing 60% by weight of melamine-formaldehyde resins solids in solution in n-butanal (10% by weight) and "Solvesso" 150 solvent[2] (30% by weight), were applied, by dip-coating, to both paper and cloth. The coated samples were then dried at 300° F. for 25 minutes. All such samples were productive of brittle resin layers which cracked on even moderate bending, and further, were heavily bubbled. Reduction of drying temperature to as low as room temperature failed to produce significant layer quality improvement.

The provision of a thin, flat rolled metal, e.g. steel, base adherent to a decorative, resin-protected fiber-based sheet provides enhanced strength, impact resistance, and heat dissipation capacity—all desirable attributes of the intended decorative laminates. Accordingly, early tests embodied adherence of the resin-coated fibrous sheet to a metal base sheet. For example, a resin mixture was prepared wherein a melamine-formaldehyde resin solution, as aforesaid, was admixed with an alkyd resin solution ("Rezyl"[3] 3105), as a flexibilizing agent, in proportions of 30% melamine resin and 70% alkyd, on weight percent of solids basis, and the mixture applied, by dipping, to both paper and cloth sheets. The resin-impregnated sheets are then applied to flat steel base sheets and the sheets pressed together and heated to cure the resin. Curing was carried out at 145° F. for 15 minutes, and also at 300° F. for 15 minutes. Bubbles formed in all such samples and, although, in some instances, the surface resin layer was otherwise of good texture, and resistant to cracking on bending, the portion of the layer beneath the paper or cloth was soft and tacky.

Other, similar tests, using polyester cloth impregnated with various melamine resin-alkyd resin mixture were conducted, wherein the resin mixture was applied, in one or two successive coats, and various curing times and temperatures were used, in an effort to reduce resin bubbling or blistering. For example, a resin mixture containing 30% by weight of Plaskon 3369 melamine-formaldehyde resin solution, and Plaskon 3105, a short-oil, non-oxidizing alkyd resin, in 65% solids solution in xylene, was dip-applied to polyester cloth, air dried for 18 hours, oven dried at 250° F. for 40 minutes, recoated, dried at 125° F. for 2 hours and again at 200° F. for 30 minutes. Despite such relatively mild heat treatment, such samples also exhibited blistering.

Similar tests, using 20% by weight of the same melamine resin solution and 80% of the same alkyd resin solution, dip-applied to surfactant-treated cloth, and dried at 300° F. for 30 minutes, gave similar, unsatisfsactory results.

Still further tests were carried out wherein a resin mixture was used consisting of 30% by weight of Plaskon 3369 melamine resin and 70% by weight of "Aroplaz"[4] 2477-X-65 (a medium oil, semi-oxidizing alkyd resin in 65% solids solution in xylene). Such mixture was dip-applied to both sides of a crepe paper sheet which was then applied to one side of a flat carbon steel base sheet and the juxtaposed sheets were oven-dried at 150° F. for 18 hours, then press-laminated at 400° F. for 2 minutes. Such samples also exhibited extensive resin blistering.

The failure of such initial tests, as regards appearance of blistering, was apparently due in large measure to the inability to remove volatile resin solvents from the deeper, resin-impregnated laminate interior, including the paper- or cloth-metal interface, without blistering, even under moderate and uneconomically protracted heating conditions.

Further, samples so prepared, wherein the interior of the fibrous sheet material, as paper, was substantially impregnated with resin, gave inconsistent and generally poor results on room temperature formability testing. Illustrative of such results are those set out in Table I.

TABLE I

| Resin Composition No. | Resin composition percent by weight of resin solution | | Cured resin layer pencil hardness, H | Laminate flexibility [1] |
|---|---|---|---|---|
| | Melamine | Alkyd | | |
| 228-1 | 30% Plaskon 3369 | 70% Plaskon 3105 | 5 | ca. 90 |
| 228-2 | 30% Plaskon 3381 | do | 5 | 90 |
| 228-3 | 30% Plaskon 3382 | do | 4 | <90 |
| 228-4 | 30% Plaskon 3369 | 70% Aroplaz 2477-X-65 | 8-9 | 170 |
| 228-5 | 30% Plaskon 3381 | do | 6-7 | 180 |
| 228-6 | do | 70% Aroplaz 7425-X-50 | | <90 |

[1] Degrees of bending at room temperature without cracking.

The resin solution mixtures of Table I were applied in approximately 20 mil thicknesses, to relatively porous, crepe-type paper sheets which, on visual examination of the laminates, were found, particularly in the case of the less crack-resistant materials, to be relatively heavily impregnated with resin which, on curing, so immobilized the interior paper fibers as to effectively prevent internal fiber slip, with consequent rupture of the impregnated sheet.

Accordingly, in order to avoid the blistering problem, subsequent tests were limited to application of resin mix-

---

[1] Trademark of Allied Chemical Company.
[2] Trademark of Standard Oil Co. of New Jersey having a Kuarl butanol number of 90–100.
[3] Trademark of American Cyanamid Co.
[4] Trademark of ADM Division of Ashland Oil Co.

tures, e.g. by spray-, knife- or roller-coating, to one side only of the fibrous sheets, the other, uncoated side of the sheet being adhesively bonded to the metal base sheet. Further, in order to prevent undue penetration of the fluent resin solution interstitially into the interior of the fibrous sheet to a depth greater than that minimally required for firm self-bonding, it was found to be necessary to pre-treat the sheet, as by application thereto of a porosity-reducing, coating such that penetration of the fluent resin solution was limited to substantially the surface portions of the fibrous sheet, e.g. not more than about 10% of the fibrous sheet thickness, and preferably a substantially lesser depth.

Such sealing or ground coating may, for example, comprise a diluted, low resin content, solution of the same resin as utilized in the top coat or layer. For example, a melamine - formaldehyde resin/alkyd resin solution of about 8 to 12%, especially about 10% total solids content, has been found useful as a surface sealing or sizing coat. Such pre-coating necessitates drying and curing of the pre-coat prior to application of the final or top resin layer.

The time and expense involved in such separate pre-treatment can be avoided, it has been found, by using papers which are surfaced treated with a porosity-reducing, surface hardening agent, such as certain cellulose-based materials, for example, a rosin-modified ethyl cellulose applied to the paper stock in toluene-solvated solution.

It has been found further that higher strength, tear-resistant papers, especially those substantially free of lignin, as virgin chemical kraft papers, are most useful in the present invention, particularly in those embodiments requiring substantial formability. Such papers have longer fibers of greater orientation than lower grade papers, thus providing the necessary internal fiber slip on sharp bending, e.g. essentially zero-radius bending, and thus affording protection against cracking of the contemplated resin coated laminates of the invention. More specially, high weight, lignin-free papers, e.g. of at least about 45 pounds basis weight free sheet are preferred. Such papers in thicknesses of about 0.002 to about 0.005, especially about 0.003 inch, have been found satisfactory for use in the production of the laminates of the invention. Thicknesses of at least about 0.002 to 0.003 inch are required in order to preserve the larger part of the paper thickness essentially free of resin coating. Greater thicknesses, though generally satisfactory, are not required provided a suitable surface porosity-reducing pre-treatment is applied and, provided further, that the laminating procedure is such as to exclude forcible penetration of the resin solution into the interior of the paper sheet. Thus, prolonged high pressure, press-lamination procedures are to be avoided for this reason.

The composition of the resin layer to be applied to the fibrous sheet is of great importance to the production of a successful laminate. Maximum utilization of the benfits of the contemplated fibrous sheet, which can be readily and economically provided with an almost unlimited variety of decorative colors and patterns dictates the use of a resin layer which is at least partially transparent or translucent, in order to provide visibility of the underlying decorative fibrous sheet. Melamine-formaldehyde resins possess the needed clarity, as well as a high degree of abrasion-resistance and chemical inertness. However, even in thin film form, such resins are insufficiently flexible, as shown above, to permit their use, in unmodified form, in a cold-formable laminate. However, it has been found that incorporation of a limited proportion of an alkyd resin, that is, curable, thermosetting, unsaturated polyesters based on a condensation reaction between a dibasic acid and a dihydric alcohol. The so-called "glypatl" resins, modified with oils or fatty acids, are useful ingredients of the resins to be used in this invention. Such oil modified alkyds may be, for example, of the short oil type (about 20–40% oil additive and over about 40% dibasic acid content, as phthalic acid or anhydride) or medium oil type (over 40 to about 60% oil additive and 29–39% dibasic acid) or long oil type (up to 20% dibasic acid), and may be either of the air drying type (due to oxidation of the drying oil), or of the heat-curable type wherein the cure is by application of heat or by heat induced cross linkage with the melamine-formaldehyde resin constituent.

Exemplary of resin formulations which are productive of protective laminate coatings in accordance with this invention are those set out below in Table II.

TABLE II

| Coating No. | Composition weight-percent solids | |
|---|---|---|
| | Melamine-formaldehyde resin | Alkyd resin |
| 228–4 | [1] 28.4 | [2] 71.6 |
| 246–1 | [1] 38.2 | [2] 61.8 |
| 246–2 | [1] 48 | [2] 52 |
| 239–2 | [3] 28.4 | [4] 71.6 |

[1] "Plaskon" 3369: 60 wt. percent melamine-formaldehyde solution in "Solvesso 150" (30 wt. percent) and n-butanol (10 wt. percent).
[2] "Aroplax" 2477-X-65: 65 wt. percent solids, medium oil, semi-oxidizing alkyd solution in xylene.
[3] "Uformite MM 46" (Trademark of Rohm & Haas Co.): 60 wt. percent melamine-formaldehyde solution in xylene (20 wt. percent) and n-butanol (20 wt. percent).
[4] "Plaskon 3105" (Trademark of Allied Chemical Co.): 65 wt. percent solids, short oil, non-oxidizing alkyd solution in xylene.

Each of the Table II coatings was continuously roller-applied, in wet thickness of form 3 to 7 mils, to a one foot wide decorated sheet, composed of substantially lignin-free, 0.003 inch thick virgin chemical kraft "decorator paper" of 55 pounds basis weight (45 pounds free sheet weight, plus 9 pounds of a coating comprising a modified rosin ethyl cellulose solvated in toluene).

The resin solvents were removed in a first heating oven zone, by passing the coated paper, at line speeds from 3 to 6 feet per minute, through such oven zone at an oven temperature of 250° F., and an air flow rate of 4000 cubic feet per minute. Thereafter, the coated web was passed into a second oven zone, held at a temperature of 390° F. and with an air flow rate of 6,000 cubic feet per minute, in order to cure the resin coating. Total oven residence time was from about 1.5 to 3 minutes. The dried, cured "tapes" so produced had resin layers of from about 1 to about 3 mils in thickness.

It was found that substantially thicker layers, e.g. 10–30 mils were not needed to provide adequate surface protection to the paper sheet and, moreover, the thicker layers are more difficult to dry and cure without solvent-blistering and, further, are less crack-resistant on cold-bending than are layers less than about 10 mils thick. Maximum cold-formability and production speed are obtained with cured resin layers below about 10 mils, especially from about 1 to about 3 to 5 mils, in thickness.

Illustratively, Table II coating No. 228–4 was applied to the Table II web material in a 20 mil (wet) coating and oven-treated at 350° F. for 30 minutes. The coating cured, but exhibited blistering.

The same coating composition, No. 228–4, was concentrated by removal of 16.4% of solvents, and similarly applied to the paper base in a 15 mil wet coating thickness.

The product was oven-treated at 250° F. for 10 minutes, followed by 375° F. for 10 minutes. Slight blistering occurred.

Further tests are exemplified by that conducted with a composition more dilute in respect to melamine-formaldehyde resin, i.e. coating No. 257-3, containing 10 parts by weight of the 228-4 melamine resin solution, 30 parts by weight of the 228-4 alkyd resin solution, and 60 parts by weight of acetone. A 12 mil thick wet film of such composition was applied to the paper base and the coated product oven-heated at 225° F. for 10 minutes, then at 350° F. for 10 minutes. Although these more moderate heating conditions avoided blistering, the dried film was tacky, indicating incomplete solvent removal and/or curing even at this extended drying time, and the final product coating was of reduced hardness, indicating incomplete curing.

Accordingly, the drying and curing conditions, e.g. of time and temperature, are of great importance in order to obtain completely cured, unblistered, hard layer coatings within economically practical production parameters. Thus, consistent with these objectives, and to achieve minimal total drying and curing times, e.g. about 1.5 to 3 minutes, the drying temperature should be maintained within the range from about 235° F. to about 265° F., and the curing temperature should be within the range of from about 370° F. to about 410° F.

After curing and cooling to room temperature, the uncoated side of each of the Table I resin-coated paper tapes was then provided with a film, from about 0.5 to 1 mil thick, of a neoprene-phenolic contact adhesive produced by dissolving in a suitable solvent a neoprene rubber-modified oil-soluble phenolic resin. After air-drying, at room temperature for about 20 mintues, to remove the adhesive solution solvent, the adhesive-filmed tape surfaces were continuously roller bonded to a similarly adhesive-coated surface of flat rolled 4 mil thick carbon steel. Such adhesives set or cure at room temperature, so no further heating of the thus-produced decorative laminate is required.

The hardness and cold-formability values of the Table II products, adhered to steel base sheets as above described, are given in Table III.

TABLE III

| Sample No. | Sward hardness | Room temperature formability |
|---|---|---|
| 228-4 | 15 | ⅛ inch mandrel—180°. |
| 246-1 | 19 | Do. |
| 246-2 | 21 | Do. |
| 239-2 | 34 | ¼ inch mandrel—90-180°. |
| "Formica"[1] -type laminate | 39 | |

[1] Trademark of American Cyanamid Co.

The Table III formability values are obtained by bending the laminate sample sheets over metal mandrels of various diameters and determining the greatest radial degree of bending over the smallest possible mandrel before cracking of the laminate was observed.

As will be seen from Table III, the products of the invention exhibit a high degree of flexibility without application of heat in the forming operation.

The necessity of limitation of resin layer thickness, from the formability aspect is seen from the following Table IV tests wherein the No. 228-4 composition, as above described, was applied directly to various metal base sheets, baked 18 hours at 150° F., then 30 minutes at 350° F.

The ressults of further flexibility tests of paper tapes, prepared as above described, and adhered to sheet steel, are given in Table V.

TABLE IV

| Test No. | Layer Thickness, mils | Mandrel diameter, inches | Bend radius, deg. | Result |
|---|---|---|---|---|
| A.—Coating on 6 mil carbon steel sheet | | | | |
| 1 | 27 | 1/16 | 90 | Coating cracked. |
| 2 | 27 | ⅛ | 180 | Satisfactory. |
| 3 | 20 | 1/16 | 90 | Coating cracked. |
| 4 | 10 | 1/16 | 90 | Satisfactory. |
| 5 | 10 | 1/16 | 180 | Do. |
| 6 | 14 | 1/16 | 90 | Do. |
| 7 | 14 | 1/16 | 180 | Coating cracked. |
| B.—Coating on 3 mil carbon steel sheet | | | | |
| 1 | 7 | 1/16 | 180 | Satisfactory. |
| 2 | 10 | 1/16 | 90 | Do. |
| 3 | 10 | 1/16 | 180 | Coating cracked. |
| C.—Coating on 6 mil aluminum sheet | | | | |
| 1 | 20 | 1/16 | 90 | Coating cracked. |
| 2 | 6 | 1/16 | 180 | Satisfactory. |
| 3 | 10 | 1/16 | 180 | Do. |

TABLE V

| Layer composition | Layer thickness, mils [1] | Mandrel diameter, inches | Bend radius, deg. | Results |
|---|---|---|---|---|
| 228-4 | 20 | ⅛ | 180 | Satisfactory. |
| 228-4 | 20 | 1/16 | 80 | Do. |
| 228-4 | 10 | ⅛ | 180 | Do. |
| 228-4 | 10 | 1/16 | 90 | Do. |
| 246-1 | 20 | ¼ | 180 | Do. |
| 246-1 | 10 | ¼ | 180 | Do. |
| 246-1 | | 1/16 | 90 | Coating cracked. |
| 246-2 | 20 | ¼ | 180 | Satisfactory. |
| 246-2 | 10 | ¼ | 180 | Do. |
| 239-2 | 10 | ¼ | 180 | Do. |
| 239-2 | 10 | ⅛ | 80 | Coating cracked. |
| 239-2 | 10 | 1/16 | 45 | Do. |

[1] Wet thickness. Dry thickness is approximately ½ the wet thickness.

As will be seen from Tables IV and V, most drastic bending, i.e. 180° over a 1/16 inch mandrel, can be expected to result in cracking of the contemplated laminates wherein the layer is at the high end of its hardness range and is over about 10 mils in thickness. Even at the 10 mil thickness value, cracking is encountered on occasion. Therefore, layer thicknesses under about 10 mils, e.g. 1 to 6 or 7 mils, especially about 1 to 3 mils, are preferred.

Cold-formability of the novel laminates is, of course, a function of the composition of the resin layer.

Since surface hardness is of great importance in the applications in which the new products are most useful, the amount of flexibilizing alkyd resin component is preferably limited, since increasingly large amounts of this component reduce hardnesses of layers comprising a given melamine resin. In general, a minimum Sward hardness of about 15 is desired, and, accordingly, the alkyd resin component is preferably limited to a maximum of about 75 weight percent of the solid resin layer. Alkyd resin is must useful on the high side of its range in conjunction with the harder, more highly cross-linked melamine resins. On the other hand, at least about 50 weight perecnt alkyd resin is required in order to achieve the necessary laminate flexibility, even with those melamine resins of less hardness.

Table VI provides the results of hardness tests of cured films of the Table II compositions, wherein those compositions were applied to and cured on a glass base (glass=100 stand on the Sward Hardness Rocker test used).

TABLE VI

| Test No. | Resin composition | Layer thickness, mils | Sward hardness |
|---|---|---|---|
| 1 | 228-4 | 2 | 17 |
| 2 | 228-4 | 2 | 18 |
| 3 | 228-4 | 2 | 18 |
| 4 | 228-4 | 2 | 16 |
| 5 | 228-4 | 2 | 19 |
| Average hardness | | | 17.6 |
| 6 | 246-1 | 3 | 16 |
| 7 | 246-1 | 3 | 18 |
| 8 | 246-1 | 3 | 16 |
| 9 | 246-1 | 3 | 16 |
| 10 | 246-1 | 3 | 17 |
| Average hardness | | | 16.6 |
| 11 | 246-2 | 2 | 19 |
| 12 | 246-2 | 2 | 20 |
| 13 | 246-2 | 2 | 21 |
| 14 | 246-2 | 2 | 18 |
| 15 | 246-2 | 2 | 21 |
| Average hardness | | | 19.8 |
| 16 | 239-2 | 3 | 32 |
| 17 | 239-2 | 3 | 43 |
| 18 | 239-2 | 3 | 30 |
| 19 | 239-2 | 3 | 32 |
| 20 | 239-2 | 3 | 31 |
| Average hardness | | | 33.6 |
| 21 | (1) | | 40 |
| 22 | (1) | | 41 |
| 23 | (1) | | 41 |
| 24 | (1) | | 39 |
| 25 | (1) | | 35 |
| Average hardness | | | 39.2 |

1 "Formica"-type laminate.

As shown in Tables III and VI, the flexible products of the invention have hardnesses upwardly of 15, and as high as about 34 or greater. At least such minimum hardness is required in order to provide the abrasion-resistance needed in many applications. The novel laminates of the invention are comparable or superior in abrasion-resistance to the commonly used, inflexible, multi-layer, melamine resin-faced decorative laminates of the prior art. Thus, composite steel-paper-resin laminates, having resin layers of the Table II composition, when subjected to an abrasion test with the Gardner Abrasion Tester, using a dry brush and 1000 cycles back and forth over the same sample area, all showed, on visual examination, less abrasion than that exhibited by a prior art multi-layer laminate as aforesaid of 30 hardness on the Sward Hardness scale. Those laminates having resin layers of composition Nos. 228-4, 246-1 and 246-2 showed very little abrasion, whereas that with composition No. 239-2 showed most abrasion, through still less than the prior art comparison sample.

Sample panels of the steel-paper-resin laminates, having resin layer compositions as given in Table II, were tested for chemical resistance to: isopropyl alcohol, vegetable oil, bleach, ink, margarine, vinegar, coffee and tea. Spot test quantities of each of these test materials were applied to each panel and allowed to remain for 3 days, after which the panels were wiped with a damp sponge and observed visually for corrosive attack. No effect was observed on any test panel.

Still further tests were conducted to determine effectiveness of the above-mentioned drying and curing procedure, as regards resin layer appearance and laminate flexibility, as compared to a more intensive drying and curing cycle which might be expected to disclose effects of incomplete drying or curing.

Table VII sets out the results of such comparative tests with respect to resin appearance, e.g. tackiness, blistering, etc. In each case, the sample consisted of a steel-paper-resin laminate prepared, dried, cured and steel-to-tape bonded as described hereinabove. Appearance rating was based on presence or absence of blisters or other imperfections, tackiness, gloss, and delamination.

TABLE VII

| Resin composition | Post-cure | Sample appearance |
|---|---|---|
| 228-4 | a. None | Good. |
| | b. 300° F. for 15 minutes | Do. |
| | c. 300° F. for 30 minutes | Do. |
| 246-1 | a. None | Do. |
| | b. 300° F. for 15 minutes | Do. |
| | c. 300° F. for 30 minutes | Do. |
| 246-2 | a. None | Very good. |
| | b. 300° F. for 15 minutes | Do. |
| | c. 300° F. for 30 minutes | Do. |

As will be seen, extensive post-curing had no further observable effect on the appearance of samples treated in accordance with the inventive procedures as aforedescribed.

Table VIII provides the results of comparative tests, post-cure vs. no post-cure, as regards product formability.

TABLE VIII

| Resin composition | Post-cure | Mandrel diam., inches | Bend radius, deg. | Result |
|---|---|---|---|---|
| 228-4 | a. None | ⅛ | 180 | Satisfactory. |
| | b. 300° F., 15 min | ⅛ | 180 | Do. |
| | c. 300° F., 30 min | ⅛ | 180 | Do. |
| 246-1 | a. None | ⅛ | 180 | Do. |
| | b. 300° F., 15 min | ⅛ | 180 | Do. |
| | c. 300° F., 30 min | ⅛ | 180 | Do. |
| 246-2 | a. None | ⅛ | 180 | Do. |
| | b. 300° F., 15 min | ⅛ | 180 | Do. |
| | c. 300° F., 30 min | ⅛ | 180 | Do. |

Although the aforementioned examples relate to resin mixtures comprising melamine-formaldeyhde resins, the invention also contemplates other thermosetting aminoplasts capable of providing, in blends with alkyd resin, clear, protective layers of high hardness and abrasion- and chemical-resistance, together with the requisite flexibility for good cold-forming properties. Exemplary of such other thermosetting aminoplasts are urea-formaldehyde resins and benzoguanamine-formaldehyde resins. The latter, being more water-resistant than melamine resins, is specifically contemplated as an alternate resin component for the novel laminates of this invention. Though more expensive than the melamine resins, benzoguanamine-formaldehyde resins are economically useful in the production of the present laminates wherein only relatively small quantities are required in a thin surface layer in order to realize the property benefits derivable from the use of such resins. Urea-formaldehyde resins, and urea/thiourea-formaldehyde resins being to varying degrees of less water-resistance than the melamine resins, are not preferred. Co-condensation products comprising two or more thermosetting aminoplasts are also contemplated as components of the aminoplast-alkyd resin blends to be used in the production of the novel laminates of this invention.

Although a degree of clarity of the resin layer is preferred, in order to utilize the decorative aspects of the underlying fibrous sheet, the resin layer may, of course, contain non-opaque colors, fillers or the like.

Although plain carbon steel is a preferred metal for the base sheet due to its strength and low cost, other metals, as copper, brass, magnesium, titanium, and, particularly, aluminum, as well as flat rollable base alloys of iron, copper, magnesium, titanium, aluminum or other metals may also be used. Relatively thin flat rolled metals are especially contemplated for the sake of flexibility and ease of fabrication of the laminated products. Metals in the foil range, about 1 to 5 or 6 mils, are particularly useful, laminates comprising the same being relatively easily cut by hand shears or the like, and such products being also amenable to ready coiling, forming and shaping without undue pressure application.

Still further modifications and substitutions may be made to the invention as herein exemplified without departing from the spirit and scope of the appended claims.

What is claimed is:

1. A flexible, cold-formable laminate comprising a flexible fibrous sheet, a cured, flexible, plastic protective layer overlying and bonded to the sheet and which in the uncured condition thereof comprises a curable resinous composition comprising a blend of at least one thermosetting aminoplast resin and a flexibilizing amount of an alkyd resin, and a porosity-reducing coating on said sheet effective to prevent said resin materials from impregnating substantially more than the surface of the fibrous sheet.

2. An article in accordance with claim 1, wherein the surface of one side of the coated sheet bears a desired decoration, and wherein the protective layer is light-transmitting to an extent sufficient to provide a desired visual effect of said decorated sheet surface.

3. An article in accordance with claim 2, wherein the fibrous sheet is a high tear-strength paper composed of flexible fibers capable of internal inter-fiber slip preventing rupture of the paper upon substantially zero-radius bending thereof.

4. An article in accordance with claim 3, wherein the aminoplast resin is selected from the group consisting of melamine-formaldehyde resins and benzoguanamine-formaldehyde resins.

5. An article in accordance with claim 4, wherein the alkyd resin comprises at least about 50 percent by weight of the resin content of the blend, and said laminate is cold-formable without cracking upon bending 180 degrees over a ¼ inch diameter mandrel.

6. An article in accordance with claim 5, wherein the aminoplast resin comprises from about 25 to about 50 percent by weight of the cured resin layer.

7. An article in accordance with claim 6, wherein the undecorated side of the fibrous sheet bears a surface film comprising an non-volatile, curable, flexible contact adhesive.

8. An article in accordance with claim 7, wherein the paper is a substantially lignin-free paper of at least about 45 pounds uncoated basis weight, and is provided, on both sides thereof, with a porosity-reducing surface coating.

9. An article in accordance with claim 8, wherein the cured resin layer has a thickness from about 1 to under 10 mils.

10. An article in accordance with claim 8, wherein the adhesive-bearing surface of the fibrous sheet is bonded to a biaxially flexible, flat rolled metal base sheet, and the resin-coated surface of the laminate has a Sward hardness of at least about 15.

11. An article of construction, wherein one side of the fibrous sheet of the laminate in accordance with claim 1, said one side being uncoated with said protective layer, is bonded to a supporting base sheet.

References Cited

UNITED STATES PATENTS

| | | | |
|---|---|---|---|
| 2,003,752 | 6/1935 | Landt | 161—220 X |
| 2,218,474 | 10/1940 | Moore | 260—850 X |
| 2,739,081 | 3/1956 | Wohnsiedler et al. | 117—76 X |
| 3,021,239 | 2/1962 | Lindenfelser et al. | 161—232 X |

OTHER REFERENCES

T. S. Hodgins et al.: "Melamine-Formaldehyde Film-Forming Compositions," Industrial and Engineering Chemistry, vol. 33, No. 6, June 1941, pp. 769-779.

JOHN T. GOOLKASIAN, Primary Examiner

R. A. DAWSON, Assistant Examiner

U.S. Cl. X.R.

117—60, 68, 68.5, 76 P, 155 L; 161—6, 82, 88, 97, 167, 214, 215, 217, 220, 232, 259, 263, 264, 413